(12) United States Patent
Slezak et al.

(10) Patent No.: US 9,423,812 B2
(45) Date of Patent: Aug. 23, 2016

(54) CURRENT MODE BOOST CONVERTER USING SLOPE COMPENSATION

(75) Inventors: Yaron Slezak, Raanana (IL); Roy Shoshani, Tel Aviv (IL)

(73) Assignee: Vishay-Siliconix, Santa Clara, CA (US)

( * ) Notice: Subject to any disclaimer, the term of this patent is extended or adjusted under 35 U.S.C. 154(b) by 0 days.

(21) Appl. No.: 13/551,516

(22) Filed: Jul. 17, 2012

(65) Prior Publication Data
US 2013/0169243 A1 Jul. 4, 2013

Related U.S. Application Data

(63) Continuation of application No. 11/823,375, filed on Jun. 26, 2007, now Pat. No. 8,222,874.

(51) Int. Cl.
| | | |
|---|---|---|
| *G05F 1/32* | (2006.01) | |
| *G05F 1/62* | (2006.01) | |
| *H02M 3/156* | (2006.01) | |
| *H02M 1/00* | (2006.01) | |

(52) U.S. Cl.
CPC ............... *G05F 1/62* (2013.01); *H02M 3/156* (2013.01); *H02M 2001/0025* (2013.01)

(58) Field of Classification Search
CPC ............. G05F 1/62; H02M 3/156; H02M 2001/0025
USPC ............... 323/313, 314, 222, 232, 234, 282
See application file for complete search history.

(56) References Cited

U.S. PATENT DOCUMENTS

| | | |
|---|---|---|
| 3,539,281 A | 11/1970 | Kramer |
| 3,654,116 A | 4/1972 | Inoue |
| 3,660,697 A | 5/1972 | Berglund et al. |
| 4,029,972 A | 6/1977 | Fox et al. |
| 4,333,050 A | 6/1982 | Yeasting |
| 4,445,202 A | 4/1984 | Goetze et al. |
| 4,831,381 A | 5/1989 | Hester |
| 4,837,495 A | 6/1989 | Zansky |

(Continued)

FOREIGN PATENT DOCUMENTS

| | | |
|---|---|---|
| DE | 3627858 | 2/1988 |
| DE | 3912849 | 11/1989 |

(Continued)

OTHER PUBLICATIONS

Richard K. Williams et al., "Optimization of Complementary Power DMOSFETs for Low-Voltage High-Frequency DC-DC Conversion", IEEE Advan. Power Elec. Conf., APEC, May 1995, Dallas Texas, pp. 765-772.

(Continued)

*Primary Examiner* — Timothy J Dole
*Assistant Examiner* — Yemane Mehari (57) ABSTRACT

A boost converter circuit that includes a power supply, an inductor coupled to the power supply to receive current from the power supply, a diode coupled to receive current from the inductor and coupled to provide current to a load as an output, an inductor switch coupled to a node between the inductor and the diode for selectively switching current from the inductor anyway from the diode, and a ramp circuit. The ramp circuit is coupled to the node between the inductor and the diode, and is configured to selectively sample a voltage at the node between the inductor and the diode via a sampling switch and use the sampled signal to produce a stabilization ramp to stabilize the output.

20 Claims, 5 Drawing Sheets

(56) References Cited

U.S. PATENT DOCUMENTS

| | | |
|---|---|---|
| 4,841,165 A | 6/1989 | Bowles |
| 5,055,991 A | 10/1991 | Carroll et al. |
| 5,212,445 A | 5/1993 | Meyer |
| 5,233,508 A | 8/1993 | Yamamura et al. |
| 5,243,234 A | 9/1993 | Lin et al. |
| 5,359,281 A | 10/1994 | Barrow et al. |
| 5,377,091 A | 12/1994 | Faulk |
| 5,408,402 A | 4/1995 | Nonnenmacher |
| 5,465,011 A | 11/1995 | Miller et al. |
| 5,596,265 A | 1/1997 | Wrathall et al. |
| 5,612,610 A | 3/1997 | Borghi et al. |
| 5,616,945 A | 4/1997 | Williams |
| 5,677,874 A | 10/1997 | Yamano |
| 5,844,403 A | 12/1998 | Sugimoto et al. |
| 5,898,328 A | 4/1999 | Shoji |
| 5,912,552 A | 6/1999 | Tateishi |
| 5,959,443 A | 9/1999 | Littlefield |
| 5,973,367 A | 10/1999 | Williams |
| 5,982,160 A | 11/1999 | Walters et al. |
| 5,994,882 A | 11/1999 | Ma |
| 6,005,785 A | 12/1999 | Kudou et al. |
| 6,031,702 A | 2/2000 | Williams |
| 6,043,715 A | 3/2000 | Bailey et al. |
| 6,104,231 A | 8/2000 | Kirkpatrick, II |
| 6,107,870 A | 8/2000 | Kawano |
| 6,154,017 A | 11/2000 | Contreras |
| 6,163,142 A | 12/2000 | Tsujimoto |
| 6,191,565 B1 | 2/2001 | Lee et al. |
| 6,239,584 B1 | 5/2001 | Jang et al. |
| 6,288,524 B1 | 9/2001 | Tsujimoto |
| 6,304,066 B1 | 10/2001 | Wilcox et al. |
| 6,313,681 B1 | 11/2001 | Yoshikawa |
| 6,329,801 B1 | 12/2001 | Zuniga et al. |
| 6,337,647 B1 | 1/2002 | Masson et al. |
| RE37,609 E | 3/2002 | Bittner |
| 6,366,070 B1 | 4/2002 | Cooke et al. |
| 6,377,032 B1 | 4/2002 | Andruzzi et al. |
| 6,430,070 B1 | 8/2002 | Shi et al. |
| 6,445,233 B1 | 9/2002 | Pinai et al. |
| 6,469,917 B1 | 10/2002 | Ben-Yaakov |
| 6,476,662 B2 | 11/2002 | Geysen |
| 6,486,645 B1 | 11/2002 | Van Auken |
| 6,515,463 B2 | 2/2003 | Ling |
| 6,577,180 B2 | 6/2003 | Liu |
| 6,703,817 B2 | 3/2004 | Cohen |
| 6,710,583 B2 | 3/2004 | Stanescu et al. |
| 6,717,388 B2 | 4/2004 | Smidt et al. |
| 6,741,130 B2 | 5/2004 | Wey et al. |
| 6,762,652 B2 | 7/2004 | De Groot |
| 6,812,676 B2 | 11/2004 | Tateishi |
| 6,815,936 B2 | 11/2004 | Wiktor et al. |
| 6,897,640 B2 | 5/2005 | Nebon et al. |
| 6,906,536 B2 | 6/2005 | Pearce et al. |
| 6,979,985 B2 | 12/2005 | Yoshida et al. |
| 7,075,275 B2 | 7/2006 | Motomori et al. |
| 7,098,637 B2 | 8/2006 | Jauregui et al. |
| 7,148,669 B2 * | 12/2006 | Maksimovic ....... H02M 1/4225 323/222 |
| 7,239,118 B2 | 7/2007 | Halberstadt et al. |
| 7,268,526 B1 | 9/2007 | Smith |
| 7,440,299 B2 | 10/2008 | Rivet |
| 7,453,246 B2 | 11/2008 | Qiu et al. |
| 7,615,981 B2 | 11/2009 | Wong et al. |
| 7,868,600 B2 | 1/2011 | Qiu et al. |
| 7,880,446 B2 | 2/2011 | Chen et al. |
| 7,960,947 B2 | 6/2011 | Chen et al. |
| 8,222,874 B2 * | 7/2012 | Slezak ................. H02M 3/156 323/232 |
| 2002/0014983 A1 | 2/2002 | Honkanen et al. |
| 2003/0039128 A1 | 2/2003 | Cohen |
| 2004/0036459 A1 | 2/2004 | Wiktor et al. |
| 2004/0240238 A1 | 12/2004 | Jauregui et al. |
| 2005/0280404 A1 * | 12/2005 | LeFevre ............. H02M 3/1584 323/282 |
| 2006/0113976 A1 | 6/2006 | Bernardon |
| 2006/0284607 A1 | 12/2006 | Isobe |

FOREIGN PATENT DOCUMENTS

| | | |
|---|---|---|
| DE | 4118918 | 12/1992 |
| EP | 0291157 | 11/1988 |
| EP | 0330142 | 8/1989 |
| EP | 03038878 | 2/1991 |
| EP | 0498917 | 8/1992 |
| EP | 0532263 | 3/1993 |
| EP | 771424 A1 | 5/1997 |
| EP | 771424 B1 | 3/1999 |
| JP | 59-204468 | 11/1984 |
| JP | 61-133816 | 8/1986 |
| JP | S63-135881 | 6/1988 |
| JP | 2-074149 | 3/1990 |
| JP | H03-503713 | 8/1991 |
| JP | 03210611 | 9/1991 |
| JP | H3-210611 | 9/1991 |
| JP | H05-304771 | 11/1993 |
| JP | H07-177731 | 7/1995 |
| JP | H08-297986 | 11/1996 |
| JP | H09-266664 | 10/1997 |
| JP | H10-014229 | 1/1998 |
| JP | H10-32331 | 2/1998 |
| JP | 10-503019 | 3/1998 |
| JP | 11-122074 | 4/1999 |
| JP | 2000-305642 | 11/2000 |
| JP | 2000-324808 | 11/2000 |
| JP | 2001-314083 | 11/2001 |
| JP | 2004-343997 | 12/2002 |
| JP | 2004-64994 | 2/2004 |
| JP | 2004-096921 | 3/2004 |
| JP | 2004-254488 | 9/2004 |
| JP | 2005-269807 | 9/2005 |
| JP | 3720963 | 11/2005 |
| JP | 2006-033958 | 2/2006 |
| JP | 2006-149065 | 6/2006 |
| JP | 2010-532152 | 9/2010 |
| KR | 10-1996-0005199 | 4/1996 |
| KR | 10-2000-0020856 | 4/2000 |
| KR | 10-2001-0002302 | 1/2001 |
| KR | 10-2003-0033973 | 5/2003 |
| KR | 10-2003-0066422 | 8/2003 |
| KR | 10-2006-0046458 | 5/2006 |
| WO | 8903609 | 4/1989 |
| WO | 0072372 | 11/2000 |
| WO | 02/058217 | 7/2002 |
| WO | 2004/004104 | 1/2004 |
| WO | 2009003063 | 12/2008 |

OTHER PUBLICATIONS

Richard K. Williams et al., "High-Frequency DC/DC Converter for Lithium-Ion Battery Applications Utilizes Ultra-Fast CBiC/D Process Technology", 1995 IEEE, pp. 322-332.

Abraham Pressman; Switching and Linear Power Supply, Power Converter Design; 1988, pp. 9-11.

* cited by examiner

FIGURE 5

CURRENT MODE BOOST CONVERTER USING SLOPE COMPENSATION

RELATED APPLICATIONS

This application is a continuation of and claims the benefit of co-pending, commonly-owned U.S. patent application Ser. No. 11/823,375, filed on Jun. 26, 2007, by Slezak et al., and titled "A Current Mode Boost Converter Using Slope Compensation," which is incorporated by reference herein.

TECHNICAL FIELD

The present invention relates to signal timing for digital integrated circuit devices.

BACKGROUND ART

Many types of electronic devices require electrical power at particular voltages suited for their particular needs. For example, an electrical outlet's voltage cannot directly power devices such as computers, digital clocks, and telephones. The outlet supplies AC and the devices and loads require DC. One option would be the use of an ac to dc conversion circuit to convert the AC voltage to power a DC load. Alternatively, power from a DC source such as one or more batteries can be used.

It is often necessary to change one DC voltage to a different DC voltage (e.g., dc to dc conversion). A boost converter is a DC to DC converter circuit that functions by producing an output voltage greater than a source voltage. A boost converter is often used to increase the voltage from one or more batteries to the required voltage level sufficient for powering a coupled electronic device.

The competitive conditions of the electronic device market places a priority on the cost efficiency and performance efficiency of boost converter circuits. For example, it is desirable that a boost converter circuit have high efficiency, which requires the circuit to have low losses. It is also desirable that the circuit have favorable operating characteristics (e.g., stability, low parasitic losses, etc.). Additionally, it is desirable that boost converter circuit components have a low pin count. A low pin count facilitates packaging of the boost converter circuit and facilitates their incorporation into other various electronic devices (e.g., reduces costs, reduces component size, etc.). Embodiments of the present invention provide novel solution to the above requirements.

BRIEF DESCRIPTION OF THE INVENTION

Embodiments of the present invention provide boost converter circuit functionality through a low pin count device. Embodiments of the present invention have high operating efficiency and favorable operating characteristics.

In one embodiment, the present invention is implemented as a boost converter circuit that includes a power supply, an inductor coupled to the power supply to receive current from the power supply, a diode coupled to receive current from the inductor and coupled to provide current to a load as an output, an inductor switch coupled to a node between the inductor and the diode for selectively switching the inductor current to either receive a current to the inductor from the power supply, or output the inductor current to a load, and a ramp circuit. The ramp circuit is coupled to the node between the inductor and the diode, and is configured to selectively sample a voltage at the node between the inductor and the diode via a sampling switch and use the sampled signal to produce a stabilization ramp to stabilize the output.

In one embodiment, the boost converter circuit is packaged as an integrated circuit device (e.g., a chip having five or fewer pins). In one embodiment, the integrated circuit device does not provide a pin for the output voltage. In one embodiment, the stabilizing ramp is configured to ensure stability for duty cycle ratios greater than 0.5. In one embodiment, the stabilizing ramp is based on increasing the receiving current ramp of the inductor by an additional ramp, the stabilizing ramp, which depends on the output voltage level.

In one embodiment, the ramp circuit is configured to selectively sample the voltage at the node between the inductor and the diode at a time when the inductor switch is off and the voltage is stabilized. The stabilizing ramp depends on the sampled signal as the output voltage level. In one embodiment, the ramp circuit further comprises a first delay component, a second delay component, and a logic gate (e.g., a 3 input AND gate). The first delay component is coupled to receive a drive input, which is also coupled to control the inductor switch. The first delay component produces a first delay signal, which is used by the second delay component to produce a second delay signal. The logic gate receives the drive signal, the first delay signal, and the second delay signal to produce a sampling switch control signal to control the sampling switch.

In this manner, embodiments of the present invention provide a boost converter circuit having high efficiency and favorable operating characteristics (e.g., stability, low parasitic losses, etc.) and having a low pin count (e.g., no pin for sampling the output voltage).

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Figure 1:
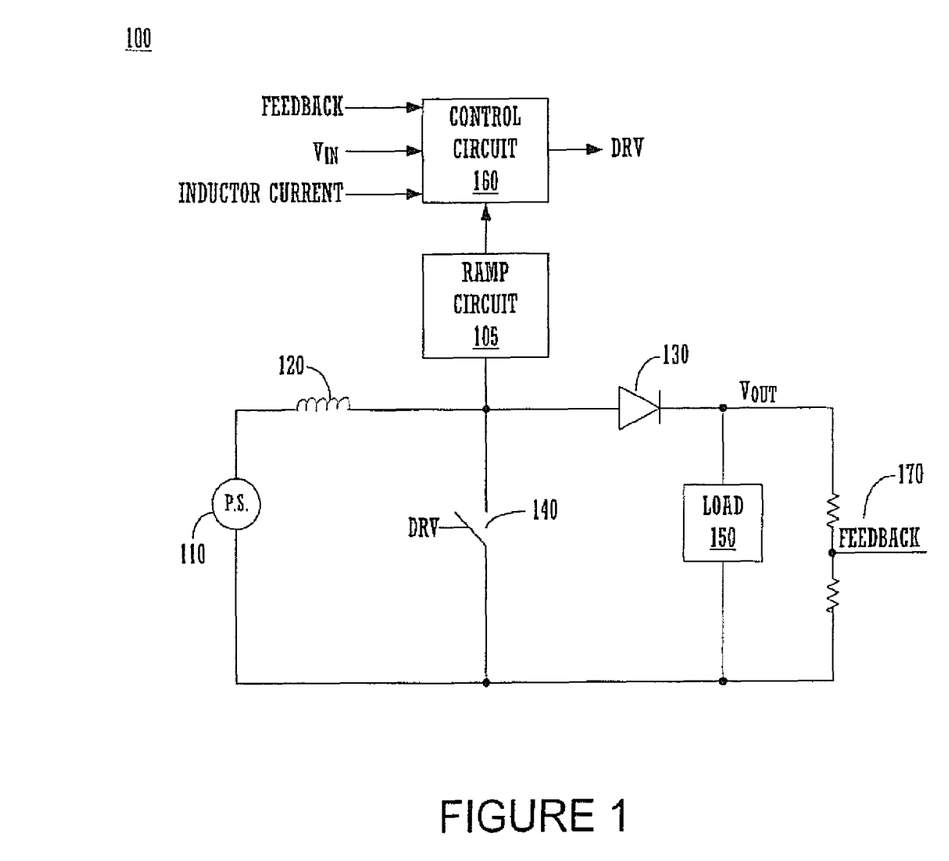
FIG. 1 shows a schematic diagram of a novel boost converter circuit in accordance with one embodiment of the present invention.

FIG. 1 shows a schematic diagram of a novel boost converter circuit 100 in accordance with one embodiment of the present invention. As illustrated in FIG. 1, the boost converter circuit 100 includes a ramp circuit 105, power supply 110, inductor 120, diode 130, inductor switch 140, a load 150, a control circuit 160, and a voltage divider 170

The FIG. 1 embodiment shows components of a boost converter circuit that provides the functionality of the present invention. As illustrated in FIG. 1, the boost converter circuit 100 includes the power supply 110 (e.g., Vin) coupled to the inductor 120 to transmit current from the power supply 110 to the inductor 120. The diode 130 is coupled to the inductor 120 to receive current from the inductor 120 and to provide current to the coupled load 150 as an output (e.g., Vout). The inductor switch 140 is coupled to a node between the inductor 120 and the diode 130 for selectively switching the inductor current to receive a current to the inductor 120 from the power supply 110, or to output the inductor 120 current to a load 150. The ramp circuit 105 is also coupled to the node between the inductor 120 and the diode 130, and is configured to selectively sample a voltage at the node between the inductor 120 and the diode 130 and use the sampled voltage to produce a stabilization ramp. This stabilization ramp is used to stabilize the output voltage Vout that is provided by the diode 130 to the load 150.

The boost converter circuit 100 functions by changing the DC voltage from the power supply 110 to a higher DC voltage Vout that is provided to the load 150 (e.g., DC to DC conversion). The boost converter circuit 100 functions in two distinct states, as determined by the inductor switch 140. In the "on" state, the inductor switch 140 is closed, resulting in an increase in inductor current (e.g., the current flowing from the power supply 110 through the inductor 120). In the "off" state, the inductor switch 140 is open and the only path offered to inductor current is through the diode 130, and to the load 150. This results in transferring the energy accumulated during the on state into the load 150. The on/off state of the inductor switch 140 (e.g., a Mosfet transistor, etc.) is controlled by the control circuit 160.

Thus, the amount of boost provided by the circuit 100 (e.g., the ratio between the input voltage provided by the power supply 110 to the output voltage from the diode 130) is controlled by the duty cycle of the inductor switch 140. Generally, the higher the duty cycle, the higher the output voltage is in comparison to the input voltage.

The ramp circuit 105 provides a stabilization ramp that stabilizes the operation of the circuit 100. Generally, high duty cycles can be problematic in that they can lead to instability in the feedback mechanism of the control circuit 160 that controls the duty cycle of the inductor switch 140. The control circuit 160 monitors the current flowing in the inductor switch 140 (e.g., when the inductor switch 140 is closed). The control circuit receives a feedback signal, Vin, and the inductor current as inputs. The control circuit produces a drive signal "DRV" that controls the inductor switch 140. The control circuit 160 sums the inductor current ramp with the stabilizing ramp which depends on the $V_{out}$ voltage level, and compares it with the feedback mechanism 170 (e.g., the feedback voltage level). This comparison determines when the inductor switch 140 is to be closed and what the duty cycle is, via the DRV signal. For example, in most implementations, without stabilization, the feedback mechanism is inherently unstable for duty cycle ratios higher than 0.5.

In one embodiment, the boost converter circuit 100 is packaged as an integrated circuit device (e.g., a chip having five or fewer pins). In one embodiment, the integrated circuit device does not provide a pin for the output voltage.

Figure 2:
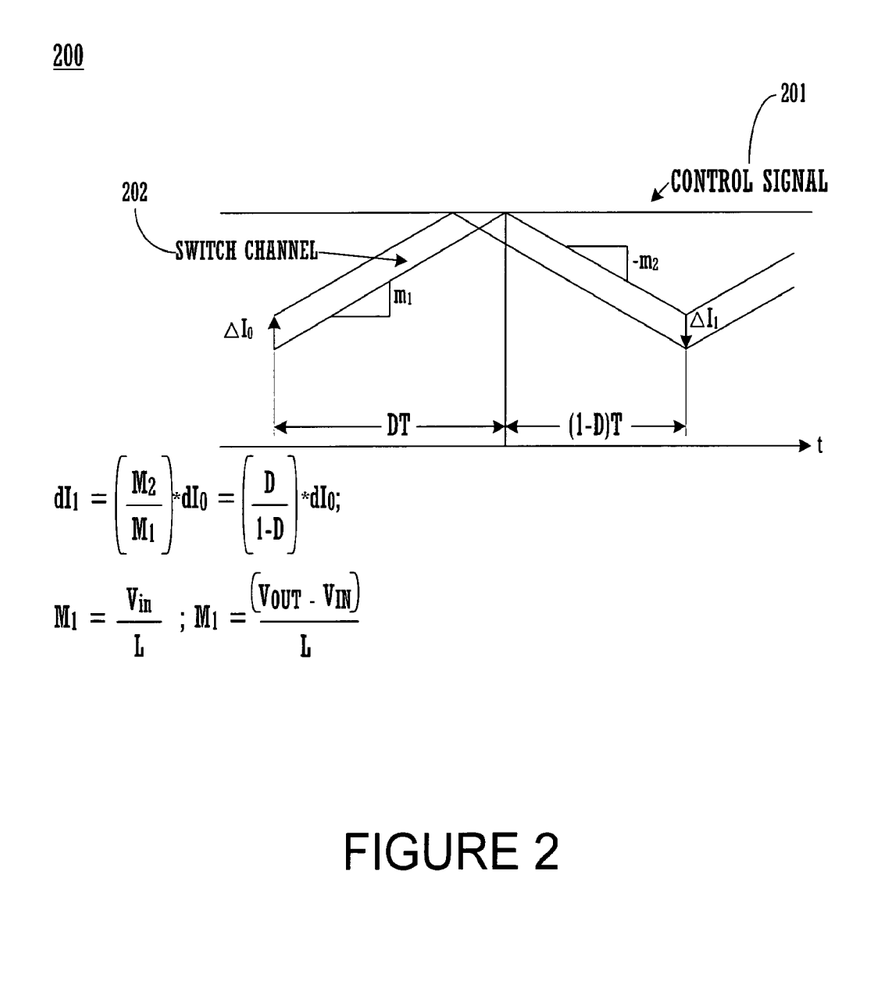
FIG. 2 shows a diagram of a current ramp without a stabilization ramp in accordance with one embodiment of the present invention.

FIG. 2 shows a diagram 200 of a current ramp without a stabilization ramp in accordance with one embodiment of the present invention. The control signal 201 is generated internally by the control circuit 160 and is used to set the output voltage level (e.g., Vout). As the current ramp 202 rises, the inductor switch duty cycle ratio is determined by the moment at which a ramp from the current sense circuit with a level proportional to the inductor switch current, reaches a threshold value determined by the control signal 201. Instability will result if $|dI_1|>|dI_0|$ because it is a growing discrepancy, cycle by cycle. This causes the feedback loop implemented by the control circuit 160 to be inherently unstable for duty ratios higher than 0.5.

Figure 3:
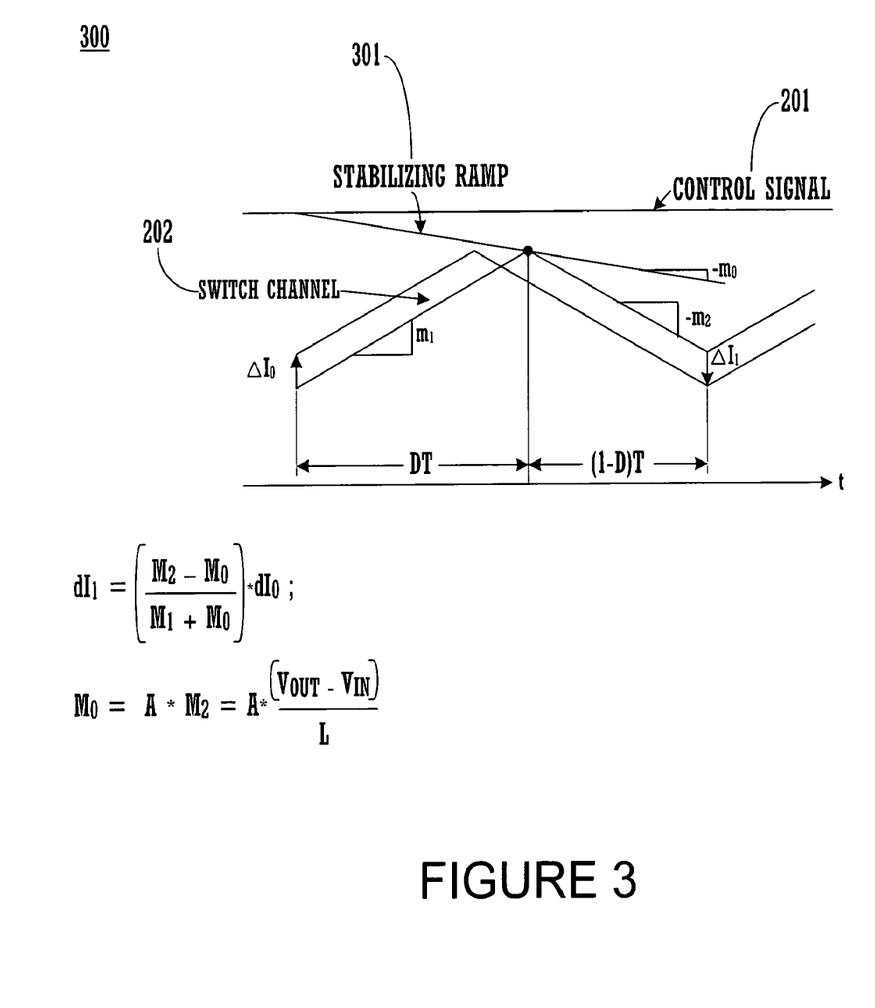
FIG. 3 shows a diagram of a current ramp having a stabilization ramp added in accordance with one embodiment of the present invention.

FIG. 3 shows a diagram 300 of a current ramp having a stabilization ramp added in accordance with one embodiment of the present invention. The stabilizing ramp produced by the ramp circuit 105 extends the range of stability for any D (e.g., inductor switch duty cycle). The stabilizing ramp is added to the current ramp 202 and is based on increasing the receiving current ramp of the inductor by an additional ramp, the stabilizing ramp, which depends on the output voltage level. In the present embodiment, the stabilizing ramp 301 can be added to the current ramp 202, and the sum of the ramps trigger at a new point. With an optimum stabilizing ramp 301, the circuit 100 is stable for any D (e.g., inductor switch duty cycle).

Figure 4:
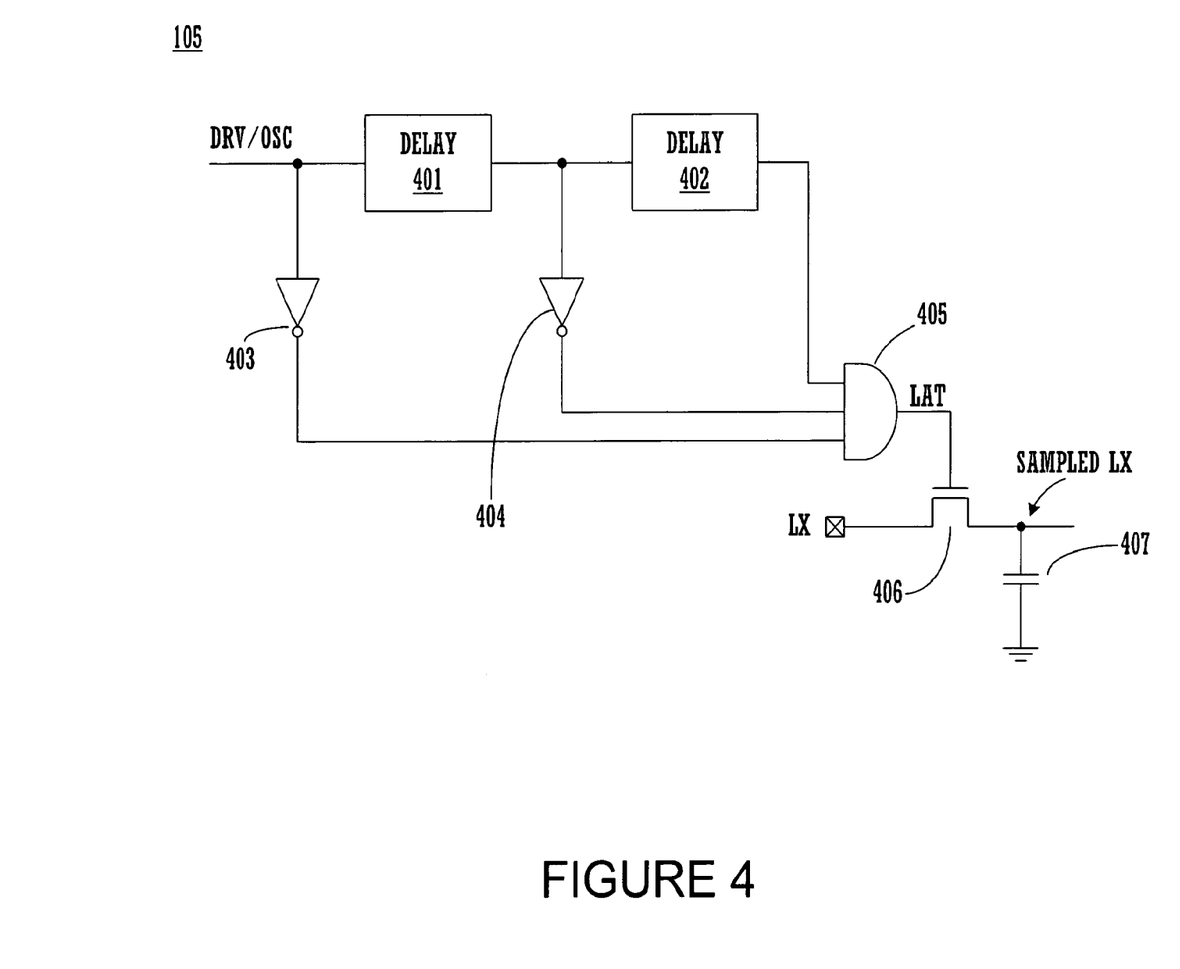
FIG. 4 shows a diagram depicting internal components of the ramp circuit in accordance with one embodiment of the present invention.

FIG. 4 shows a diagram depicting internal components of the ramp circuit 105 in accordance with one embodiment of the present invention. As depicted in FIG. 4, the ramp circuit 105 includes first and second delay elements 401-402, first and second inverters 403-404, a three input logic gate 405 (e.g., AND gate), a sample switch 406, and a sampling capacitor 407.

In one embodiment, the ramp circuit 100 is configured to selectively sample the voltage at the node between the inductor 120 and the diode 130 at a time when the inductor switch 140 is off and the voltage at the node is stabilized. This node is referred to as "LX" and can be sampled and used to generate the stabilization ramp as opposed to using the $V_{out}$ voltage level (e.g., which would require a dedicated $V_{out}$ pin). In one embodiment, this attribute enables the elimination of any dedicated $V_{out}$ pin from a semiconductor device package. It should be noted that LX is within a diode forward voltage (e.g., 0.3 volts, etc.) to Vout, and this attribute facilitates its usage in place of $V_{out}$.

The FIG. 4 embodiment uses the DRV signal that controls the on/off state of the inductor switch 140. The inverters 403-404 and the delay elements 401-402 create the inputs to the AND gate 405 as shown. The output of the AND gate 405 controls the sampling switch 406 (e.g., a Mosfet transistor, etc.), and thus the sampling and storing of the LX voltage onto the sampling capacitor 407.

Figure 5:
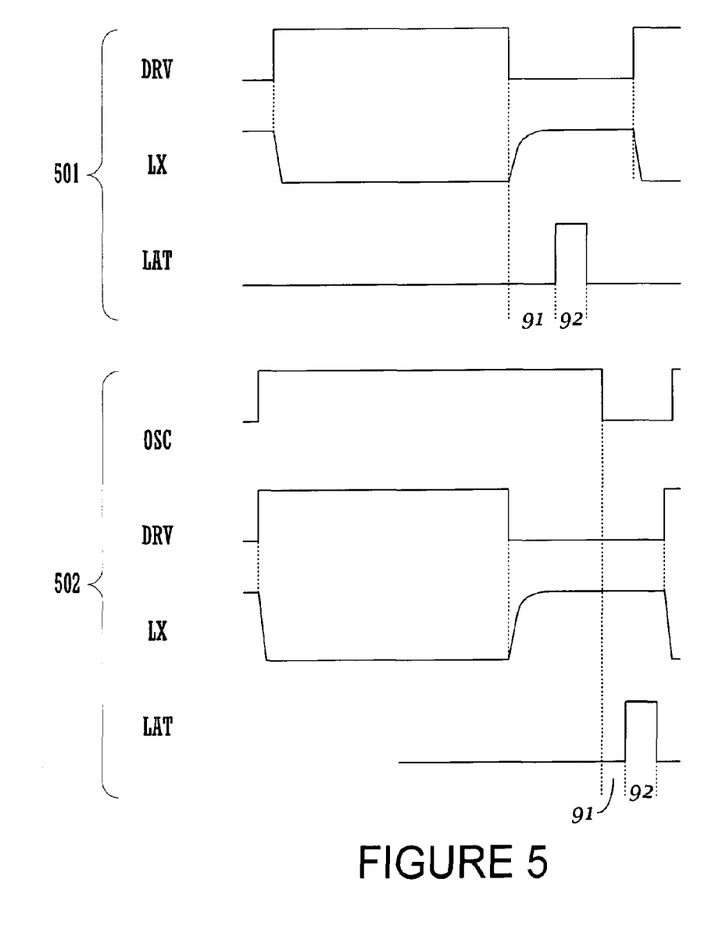
FIG. 5 shows the timing diagram illustrating the operation of the ramp circuit in accordance with one embodiment of the present invention.

FIG. 5 shows the timing diagram 500 illustrating the operation of the ramp circuit 110 in accordance with one embodiment of the present invention. As depicted in FIG. 5, and as described above, the DRV signal provides the basic timing for the ramp circuit 110.

FIG. 5 shows two modes of operation 501 and 502 in accordance with one embodiment of the present invention. In mode 501, the LX pin is sampled based on the timing of the inductor switch control (e.g., DRV). The latching signal is called "LAT". In one embodiment, it comprises a pulse having a width of approximately tenth of a nanosecond. The assertion of the "LAT" signal happens after delay1 from DRV negation. The negation of the "LAT" signal happens after delay2 from "LAT" assertion, or when a new cycle begins (e.g., when DRV is asserted). The sampled data is stored over the sampling capacitor 407.

In mode 502, the LX pin is sampled based on the timing of an externally provided clock signal "OSC". The latching signal "LAT" is generated during the last 5-10% period of each cycle, when OSC signal goes low and there is no DRV signal. The assertion of "LAT" happens after delay 1 from "OSC" negation. The negation of "LAT" happens after delay2 from "LAT" assertion. The sampled data is stored over the sampling capacitor 407.

In one embodiment, the ramp circuit further comprises a first delay component, a second delay component, and a logic gate (e.g., a 3 input AND gate). The first delay component is coupled to receive a drive input, which is also coupled to control the inductor switch. The first delay component produces a first delay signal, which is used by the second delay component to produce a second delay signal. The logic gate receives the drive signal, the first delay signal, and the second delay signal to produce a sampling switch control signal to control the sampling switch.

In this manner, embodiments of the present invention provide a boost converter circuit having high efficiency and favorable operating characteristics (e.g., stability, low parasitic losses, etc.) and having a low pin count (e.g., no pin for the output voltage).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A boost converter circuit, comprising:
    a power supply;
    an inductor coupled to the power supply to receive current from the power supply;
    a diode coupled to receive current from the inductor and coupled to provide current to a load as an output;
    an inductor switch coupled to a node between the inductor and the diode for selectively switching an inductor current to receive a current to the inductor from the power supply, or output the inductor current to a load; and
    a ramp circuit coupled to the node between the inductor and the diode, wherein the ramp circuit is configured to selectively sample a voltage at the node between the inductor and the diode via a sampling switch and use the sampled signal to produce a stabilization ramp to stabilize the output.

2. The boost converter circuit of claim 1, wherein the boost converter circuit is packaged as an integrated circuit device.

3. The boost converter circuit of claim 2, wherein the integrated circuit device does not provide a pin for the output voltage.

4. The boost converter circuit of claim 1, wherein the stabilization ramp is configured to insure stability for duty cycle ratios greater than 0.5.

5. The boost converter circuit of claim 1, wherein the stabilization ramp depends on the output voltage level and is added to increase a receiving current ramp of the inductor by adding the stabilization ramp.

6. The boost converter circuit of claim 1, wherein the ramp circuit is configured to selectively sample the voltage at the node between the inductor and the diode at a time when the inductor switch is off and the voltage is stabilized.

7. The boost converter circuit of claim 6, wherein the voltage at the node is substantially similar to the output voltage level.

8. The boost converter circuit of claim 1, wherein the ramp circuit comprises:
    the sampling switch; and
    a sampling capacitor coupled to the sampling switch to receive and store the voltage at the node between the inductor and the diode.

9. A boost converter integrated circuit device, comprising:
    a power supply input for receiving a power supply;
    an inductor coupled to the power supply input to receive current from the power supply;
    a diode coupled to receive current from the inductor and coupled to provide current to a load coupled to the integrated circuit device as an output;
    an inductor switch coupled to a node between the inductor and the diode for selectively switching an inductor current to receive a current to the inductor from the power supply, or to output the inductor current to the load; and
    a ramp circuit coupled to the node between the inductor and the diode, wherein the ramp circuit is configured to selectively sample a voltage at the node between the inductor and the diode via a sampling switch and use the sampled signal to produce a stabilization ramp to stabilize the output.

10. The boost converter integrated circuit device of claim 9, wherein the integrated circuit device does not provide a pin for the output voltage.

11. The boost converter integrated circuit device of claim 9, wherein the stabilization ramp is configured to insure stability for duty cycle ratios greater than 0.5.

12. The boost converter integrated circuit device of claim 9, wherein the stabilization ramp depends on the output voltage level and is based on increasing a receiving current ramp of the inductor by adding the stabilization ramp.

13. The boost converter integrated circuit device of claim 9, wherein the voltage at the node between the inductor and the diode is sampled at a time when the inductor switch is off and the voltage is stabilized.

14. The boost converter integrated circuit device of claim 9, wherein the ramp circuit comprises:
    the sampling switch; and
    a sampling capacitor coupled to the sampling switch to receive and store the voltage at the node between the inductor and the diode.

15. A method comprising:
    receiving a current from a power supply at an inductor coupled to the power supply;

receiving current from the inductor at a diode coupled to the inductor;

outputting current from the diode to a load coupled to the diode as an output voltage;

selectively switching an inductor current to either receive a current to the inductor from the power supply, or output the inductor current to the load, by an inductor switch coupled to a node between the inductor and the diode; and selectively sampling a voltage at the node between the inductor and the diode via a sampling switch of a ramp circuit coupled to the node via the sampling switch, wherein the ramp circuit is configured to use the sampled signal to produce a stabilization ramp to stabilize the output voltage, a boost converter circuit comprising the inductor, the diode, the inductor switch, and the ramp circuit.

16. The method of claim 15, wherein the boost converter circuit is packaged as an integrated circuit device.

17. The method of claim 16, wherein the integrated circuit device does not provide a pin for the output voltage.

18. The method of claim 15, wherein the stabilization ramp is configured to insure stability for duty cycle ratios greater than 0.5.

19. The method of claim 15, wherein the stabilization ramp is based on increasing a receiving current ramp of the inductor by the stabilizing ramp, which depends on the output voltage level.

20. The method of claim 15, wherein the ramp circuit is configured to selectively sample the voltage at the node between the inductor and the diode at a time when the inductor switch is off and the voltage is stabilized.

* * * * *